US011035509B2

(12) United States Patent
Irvine et al.

(10) Patent No.: US 11,035,509 B2
(45) Date of Patent: Jun. 15, 2021

(54) METAL-TO-METAL WELL EQUIPMENT SEAL

(71) Applicants: Jock W. Irvine, Houston, TX (US); Thomas M. Lambert, Houston, TX (US)

(72) Inventors: Jock W. Irvine, Houston, TX (US); Thomas M. Lambert, Houston, TX (US)

(73) Assignee: CONTROL FLOW, INC., Houston, TX (US)

( * ) Notice: Subject to any disclaimer, the term of this patent is extended or adjusted under 35 U.S.C. 154(b) by 0 days.

(21) Appl. No.: 15/600,440

(22) Filed: May 19, 2017

(65) Prior Publication Data

US 2017/0336003 A1 Nov. 23, 2017

Related U.S. Application Data

(60) Provisional application No. 62/338,905, filed on May 19, 2016.

(51) Int. Cl.
*F16L 23/20* (2006.01)
*G01M 3/02* (2006.01)
*F16L 23/16* (2006.01)
*F16J 15/08* (2006.01)
*E21B 33/03* (2006.01)

(52) U.S. Cl.
CPC .............. *F16L 23/20* (2013.01); *E21B 33/03* (2013.01); *F16J 15/08* (2013.01); *F16L 23/167* (2013.01); *G01M 3/022* (2013.01); *F16L 2201/30* (2013.01)

(58) Field of Classification Search
CPC .......... F16J 15/02; F16J 15/062; F16J 15/064; F16J 15/08; F16J 15/0881; F16J 15/0887; F16J 15/0893; F16L 23/20; F16L 15/008; F16L 15/053; F16L 19/0218
USPC ............. 285/368, 351, 334.2, 371, 353, 354
See application file for complete search history.

(56) References Cited

U.S. PATENT DOCUMENTS 1,858,136 A * 5/1932 Brenner ................... F16L 19/04
                                                    285/332.4
1,873,855 A * 8/1932 Wilson .................... F16L 23/20
                                                    277/614

(Continued)

FOREIGN PATENT DOCUMENTS

| CH | 499052 A | 12/1970 |
|---|---|---|
| EP | 2828560 B1 | 3/2017 |
| EP | 2619496 B1 | 11/2019 |

*Primary Examiner* — Kristina R Fulton
*Assistant Examiner* — L. Susmitha Koneru
(74) *Attorney, Agent, or Firm* — Matthews, Lawson, McCutcheon & Joseph, PLLC

(57) ABSTRACT

A metal-to-metal sealing system is described for forming a pressure-activated connection between two pieces of equipment under HPHT (high pressure high temperature) conditions which will degrade elastomers. The roughly cylindrical seal comprises four sealing surfaces, two sealing surfaces formed by the circular longitudinal edge, and two sealing surfaces formed by either side of a bulge located halfway along the outer diameter. These surfaces correspond with sealing surfaces on the pieces of equipment to be joined. These pieces of equipment also utilize testing ports in fluid communication with the seal in order to ensure a secure connection.

7 Claims, 7 Drawing Sheets

(56) References Cited

U.S. PATENT DOCUMENTS

| | | | | |
|---|---|---|---|---|
| 2,350,017 A | * | 5/1944 | Davis | F16L 19/10 285/342 |
| 2,423,655 A | * | 7/1947 | Mars | F16L 19/065 285/341 |
| 2,438,529 A | * | 3/1948 | Woodling | F16L 27/0816 285/281 |
| 2,463,883 A | * | 3/1949 | Kinsey | F16L 19/04 285/328 |
| 2,469,851 A | * | 5/1949 | Stecher | F16L 19/04 285/104 |
| 2,475,026 A | * | 7/1949 | Hynes | F16L 27/1008 285/341 |
| 2,477,677 A | * | 8/1949 | Woodling | F16L 19/04 285/281 |
| 2,599,389 A | * | 6/1952 | Hume | F16L 19/028 285/93 |
| 2,685,461 A | * | 8/1954 | Mueller | F16L 19/04 285/332.2 |
| 2,748,463 A | * | 6/1956 | Mueller | F16L 19/04 29/523 |
| 3,210,098 A | * | 10/1965 | Watts | F16L 23/12 285/148.11 |
| 3,241,867 A | * | 3/1966 | Guarnaschelli | F16L 27/0812 285/109 |
| 3,248,136 A | * | 4/1966 | Brozek | F16L 19/10 285/341 |
| 3,307,854 A | | 3/1967 | Hatfield | |
| 3,352,577 A | * | 11/1967 | Medney | F16L 23/0283 285/246 |
| 3,471,181 A | * | 10/1969 | Fuentes | F16L 19/10 285/341 |
| 3,507,506 A | * | 4/1970 | Tillman | F16L 23/20 277/614 |
| 3,563,573 A | * | 2/1971 | Crompton | F16L 23/125 285/55 |
| 3,708,186 A | * | 1/1973 | Takagi | F16L 19/12 285/341 |
| 3,749,426 A | * | 7/1973 | Tillman, III | F16L 23/20 285/336 |
| 3,940,168 A | * | 2/1976 | Balon | F16L 39/00 285/122.1 |
| 4,260,182 A | * | 4/1981 | Bruner | F16L 19/10 285/23 |
| 4,269,438 A | * | 5/1981 | Ridenour | B21D 39/04 285/382.2 |
| 4,403,795 A | * | 9/1983 | Davlin | F16D 1/033 285/184 |
| 4,450,618 A | * | 5/1984 | Ridenour | B21D 39/04 29/509 |
| 4,480,861 A | * | 11/1984 | Cann, Jr. | F16L 23/024 285/334.2 |
| 4,503,680 A | * | 3/1985 | Wood | F01D 25/243 285/233 |
| 4,610,069 A | * | 9/1986 | Darbois | B21D 26/14 285/382.7 |
| 4,626,002 A | * | 12/1986 | Hagemeister | F16J 12/00 277/610 |
| 4,630,846 A | * | 12/1986 | Nishino | B29C 37/0082 285/21.1 |
| 4,798,404 A | * | 1/1989 | Iyanicki | F16L 19/075 285/12 |
| 4,836,583 A | * | 6/1989 | Maier | F16L 19/0206 285/336 |
| 4,867,483 A | * | 9/1989 | Witt | F16L 19/0218 285/23 |
| 5,174,615 A | * | 12/1992 | Foster | F16L 23/16 285/334.2 |
| 5,328,211 A | * | 7/1994 | Lewis | F16L 23/147 285/23 |
| 5,332,161 A | * | 7/1994 | Schweitzer | F23D 14/64 239/390 |
| 5,505,464 A | | 4/1996 | McGarvey | |
| 5,833,280 A | * | 11/1998 | Ferlin | B21D 39/04 285/330 |
| 5,944,319 A | | 8/1999 | Kohlman et al. | |
| 6,170,888 B1 | * | 1/2001 | Ridenour | F16L 13/141 285/330 |
| 6,299,216 B1 | * | 10/2001 | Thompson | F16L 23/167 285/93 |
| 6,409,176 B2 | * | 6/2002 | Allen | E21B 33/035 277/340 |
| 6,578,881 B2 | * | 6/2003 | Lynn | C23C 14/3407 285/354 |
| 6,869,080 B2 | | 3/2005 | Janoff et al. | |
| 7,066,496 B2 | * | 6/2006 | Williams | F16L 19/14 285/249 |
| 7,107,662 B1 | * | 9/2006 | Levario | F16L 23/125 277/608 |
| 7,108,288 B2 | * | 9/2006 | Bennett | F16L 19/14 285/3 |
| 7,393,018 B2 | * | 7/2008 | Williams | F16L 19/14 285/249 |
| 7,784,837 B2 | * | 8/2010 | Williams | F16L 23/06 285/342 |
| 7,950,701 B2 | * | 5/2011 | Dole | F16L 21/065 285/367 |
| 8,205,890 B2 | | 6/2012 | Sundararajan | |
| 8,899,551 B2 | * | 12/2014 | Linser | F16K 13/00 251/324 |
| 9,033,054 B2 | | 5/2015 | Curington | |
| 9,045,961 B2 | | 6/2015 | Melancon et al. | |
| 9,488,302 B2 | * | 11/2016 | Gjerstad | F16L 23/04 |
| 9,797,532 B2 | * | 10/2017 | Makino | B21D 17/025 |
| 2004/0075276 A1 | * | 4/2004 | Lemke | F01N 13/1811 285/367 |
| 2004/0150226 A1 | * | 8/2004 | Hystad | F16L 23/167 285/368 |
| 2006/0181081 A1 | * | 8/2006 | Matzner | F16L 25/12 285/364 |
| 2011/0227337 A1 | * | 9/2011 | Kattler | F16L 19/103 285/351 |
| 2015/0108723 A1 | * | 4/2015 | Bekkevold | F16L 15/04 277/609 |
| 2015/0330169 A1 | | 11/2015 | Coutts, Jr. et al. | |

* cited by examiner

METAL-TO-METAL WELL EQUIPMENT SEAL

REFERENCE TO RELATED APPLICATIONS

The present application claims priority to U.S. Provisional Application No. 62/338,905, filed 19 May 2016, and entitled "Metal-to-Metal Well Equipment Seal." The contents of the above-referenced application are incorporated herein by reference.

FIELD

Embodiments usable within the scope of the present disclosure relate, generally, to a pressure-activated metal-to-metal seal for wellheads and other oil & gas equipment. The metal-to-metal seals are operable in highly corrosive, high-temperature high-pressure (HPHT) conditions.

BACKGROUND

It is increasingly common in the oil & gas industry for exploration operations to take place in harsh, unfriendly environments and well conditions. Therefore, wellhead equipment must be built to withstand high pressure, high temperature (HPHT) environments, as well as to operate efficiently within conditions that include high levels of sulfides, carbon dioxide, and other corrosive gases or compounds. Such conditions often require a "dual" seal, meaning at least two independent barriers.

Currently, a common procedure is to coat flanged outlets with a non-corrosive metal, such as Inconel, and accomplish a secondary seal using elastomeric rings or gaskets. However, even these options often see high failure rates. Additionally, they often have limited versatility as the metal must be machined for each joint.

A need exists for a system which is made more reliable by the internal pressure inside the wellhead and which can be independently pressure tested at installation. A need also exists for a system which can be adapted and installed by modification in existing API standard flanges/outlets, along with the standard API ring gaskets or ASME-equivalent ring-type joints to provide an additional corrosion-resistant barrier through a metal-to-metal seal.

Embodiments of the apparatus described herein meet this and other needs.

BRIEF DESCRIPTION OF THE DRAWINGS

In the detailed description of the embodiments, presented below, reference is made to the accompanying drawings.

One or more embodiments are described below with reference to the listed Figures.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings, and that the components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

The present invention relates, generally, to a metal-to-metal seal configuration for use in highly corrosive, HPHT environments but has application in other areas as well. This configuration can work in tandem with an existing seal such as a ring-type joint (RTJ) to create a secondary metal-to-metal seal, whereas in existing configurations the secondary seal is usually a standard API ring gasket or single seal combination of metal and elastomer or other easily degraded material.

Figure 1B:
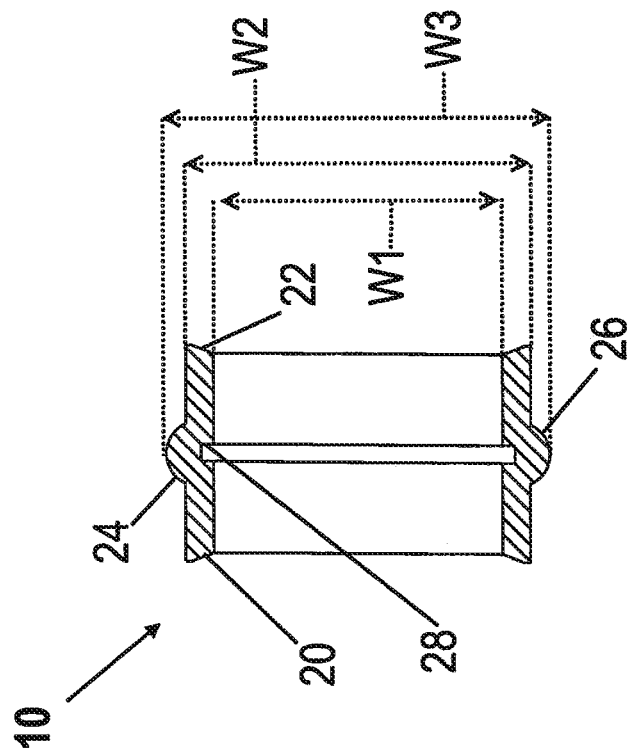
FIG. 1B depicts a cross-section of the embodiment of the seal depicted in FIG. 1A along section line B-B.
Figure 1A:
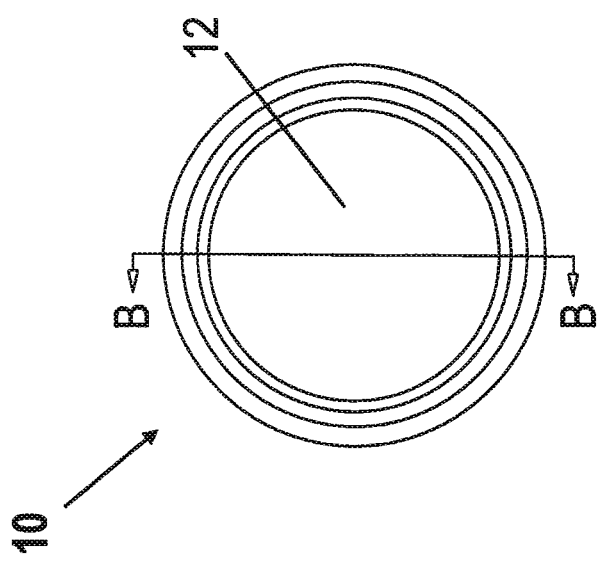
FIG. 1A depicts an overhead view of an embodiment of the seal disclosed herein.

Referring now to FIGS. 1A and 1B, an overhead view of an exemplar seal 10 is shown, in overhead view in FIG. 1A, as a roughly cylindrical metallic surface surrounding a bore 12 therethrough, and in cross-section along section line B-B in FIG. 1B. Seal 10 comprises a total of four sealing surfaces 20, 22, 24, 26, where sealing surfaces 20, 22 form a lip on either side of the seal while sealing surfaces 24, 26 form the shape of a radial (i.e., semi-circular) bulge extending concentrically around the longitudinal axis of the seal.

Internally, the seal also features a groove 28 located interior to the two sealing surfaces 24, 26. Groove 28 fulfills two functions: it allows the seal 10 to flex slightly should there be bending, movement, or a change in temperature to the equipment during installation and operation, and it also serves as an extraction groove should the seal 10 become lodged within the equipment.

In the depicted embodiment, seal 10 comprises a first width W1 which is defined by the inner diameter of the bore 12 enclosed by the seal 10, a second width W2 which is defined by the outer diameter of the seal 10 (i.e., the difference between W1 and W2 is a function of seal thickness), and a third width W3 which represents the maximal width at the apex of the two sealing surfaces 24, 26.

Figure 2C:
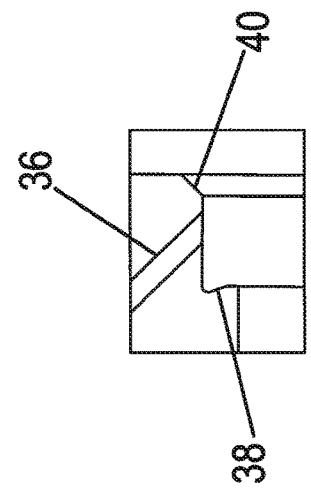
FIG. 2C depicts a magnified cross-section of section C of the flange connection depicted in FIG. 2B.
Figure 2B:
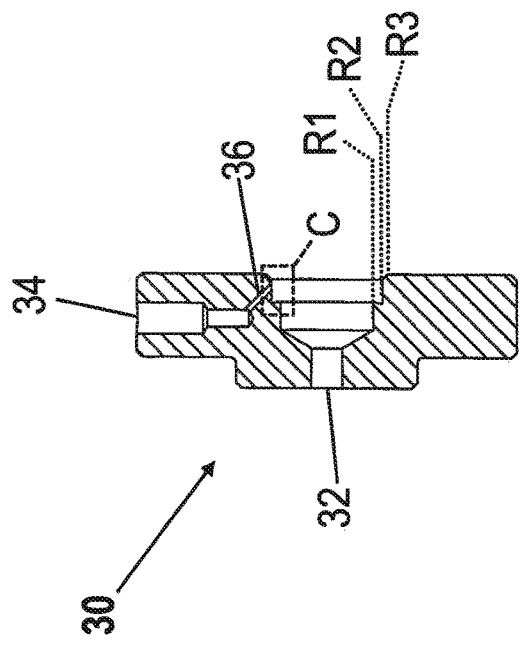
FIG. 2B depicts a cross-section of the flange connection depicted in FIG. 2A along section line B-B.
Figure 2A:
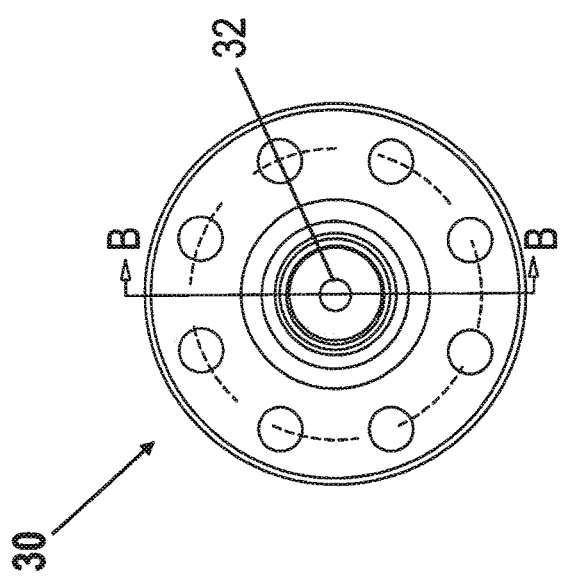
FIG. 2A depicts a flange connection to be used with an embodiment of the seal disclosed herein.

Referring now to FIGS. 2A-2C, a standard flange connection 30 is shown comprising a central bore 32 therethrough. FIG. 2A depicts the flange connection 30 in side view, while FIG. 2B depicts a cross-sectional view along section line B-B. FIG. 2B depicts a test port 34 located within the flange connection 30 for monitoring the internal pressure of the flange connection 30. FIG. 2C depicts a magnified view of section C of FIG. 2B which includes the fluid connection 36 between the test port 34 and the central bore 30. Flange connection 30 is also depicted with a negatively angled sealing surface 38 which corresponds to the sealing surface 20 of the seal 10 (both depicted in FIG. 1B).

The central bore 32 of flange connection 30 is also depicted having a series of sealing surfaces 38, 40 corresponding to stepwise changes in radius, shown as R1, R2, and R1 These radii R1, R2, R3 correspond to the W1, W2, W3 widths (i.e., diameters) shown in FIG. 1B. (As every diameter implies a radius and vice versa, they are marked as radii solely for clarity.)

Referring now to FIGS. 3A-3D, two flange connections 30A, 30B are shown abutted end-to-end in cross-section with their respective bores aligned to form a single bore 32 therethrough. Seal 10 is aligned within bore 32 and the sealing surfaces 20, 22, 24, 26 of the seal 10 (depicted in FIG. 1B) are aligned with the respective sealing surfaces of the flange connections 30A, 30B. Test ports 34A and 34B are shown fluidly connected to seal 10, and a test plug 42 may be present during pressure testing. In addition, flange connections 34A, 34B may comprise a secondary groove 31. This secondary groove 31 can accommodate an RTJ gasket 33 illustrated in FIG. 3D.

Figure 4C:
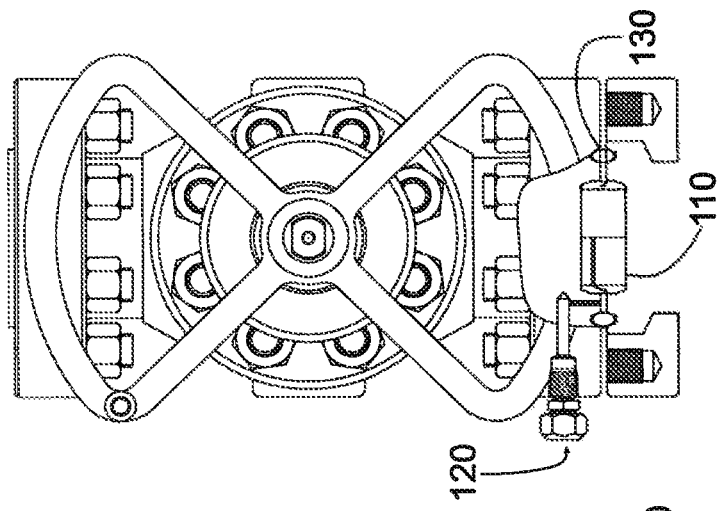
FIG. 4C depicts a swivel wellhead outlet with an embodiment of the seal and test port disclosed herein.
Figure 4B:
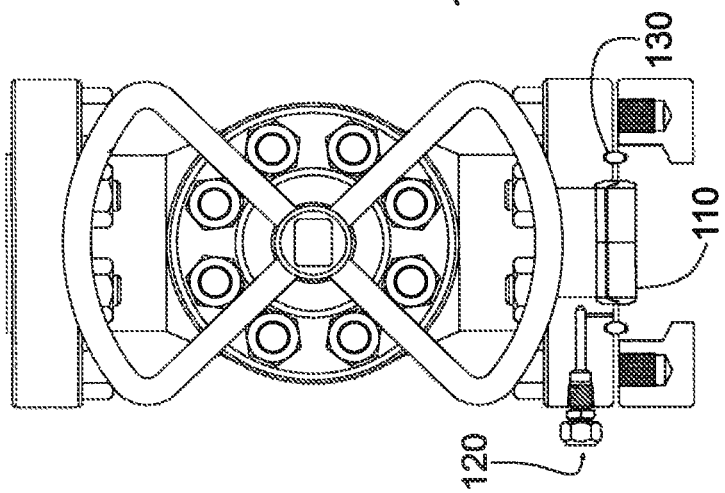
FIG. 4B depicts a swivel flanged wellhead outlet with an embodiment of the seal and test port disclosed herein.
Figure 4A:
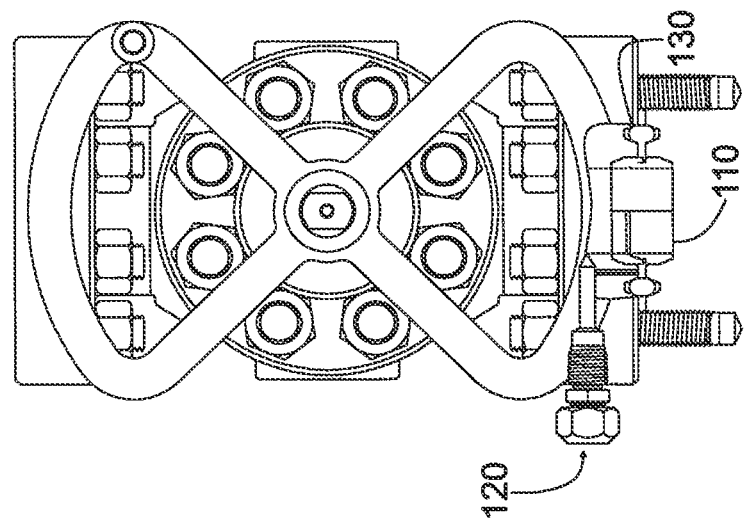
FIG. 4A depicts a standard studded wellhead outlet with an embodiment of the seal and test port disclosed herein.

Referring now to FIGS. 4A-4C, three examples of wellhead connections are depicted, each having a secondary seal 110 and a test port 120, as well as a standard ring-type joint (RTJ) 130. The present invention can be retro-fitted to existing "in-field" pieces of equipment (gate valves, wellheads, Christmas tree valves, choke valves, spools) or can be originally present in equipment through manufacturing. As shown, test port 120 can be in communication with the area between RTJ seal 130 and secondary seal 110 in order to determine the efficacy of the secondary seal in isolation.

Figure 5B:
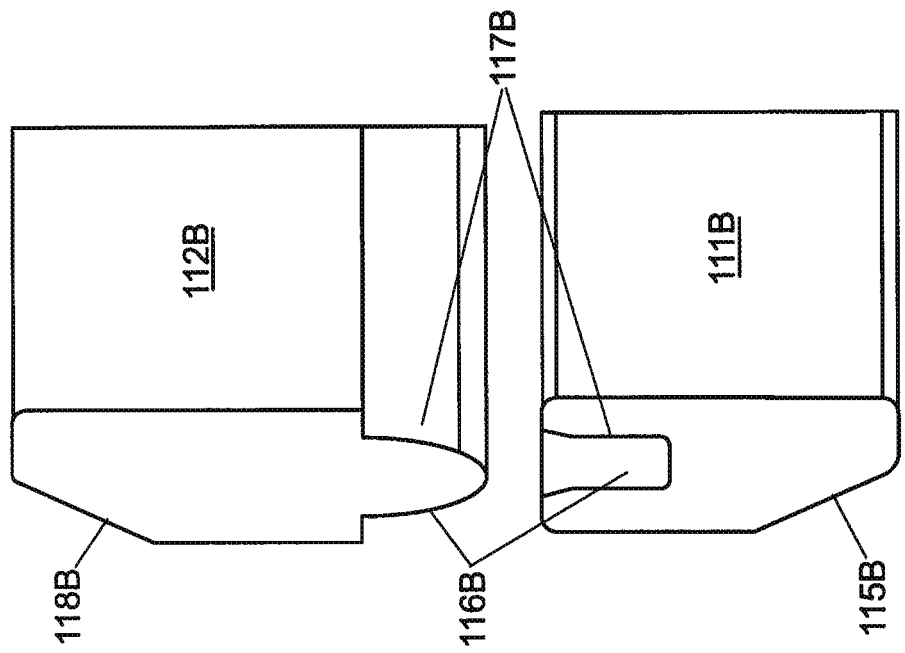
FIG. 5B depicts a zoomed-in view of an alternate embodiment of the seal disclosed herein.
Figure 5A:
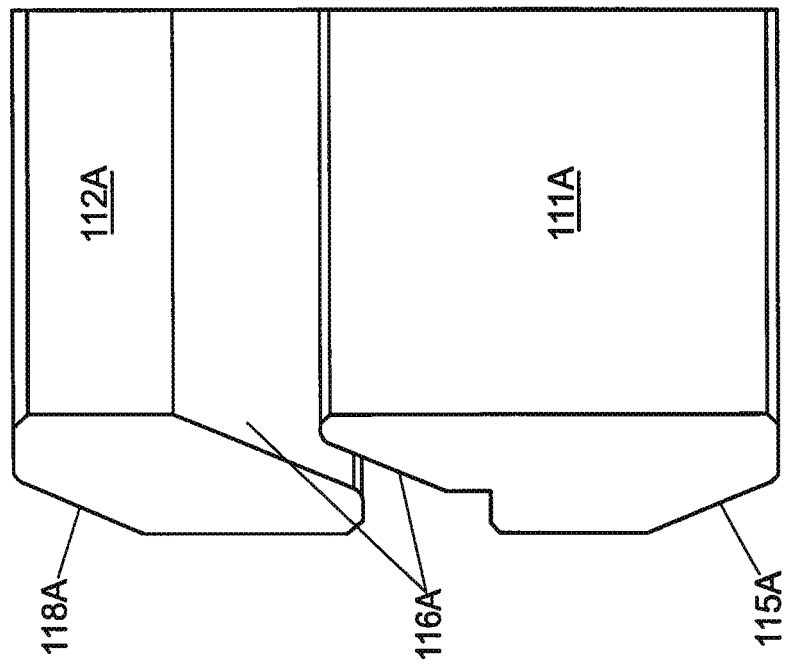
FIG. 5A depicts a zoomed-in view of one embodiment of the seal disclosed herein.

Referring to FIG. 5A, a zoomed-in alternative embodiment of the secondary seal 110A as depicted in FIGS. 4A-14C is shown. The embodiment depicted in FIG. 5A comprises a lower sealing bowl 111A, an upper sealing bowl 112A, and three sealing areas 115A, 116A, and 118A. In this embodiment, the fluid pressure within a wellbore is in the upward direction from lower sealing bowl 111A to upper sealing bowl 112A. Thus, sealing area 115A seals the lower sealing bowl 111A against well equipment (e.g., wellheads, gate valves, Christmas tree valves, choke valves, spools, etc.) while sealing area 118A seals the upper sealing bowl 112A against the well equipment to be connected. Sealing area 116A seals lower sealing bowl 111A against upper sealing bowl 112A. The angles of sealing areas 115A, 116A, and 118A ensure that fluid pressure works to further activate the seal after initial connection through torqued studs/nuts as shown in FIGS. 4A-4C.

Referring to FIG. 5B, an alternate embodiment of a secondary seal 110B is depicted which can be used interchangeably and in the same fashion as secondary seal 110A. As with secondary seal 110A, secondary seal 110B comprises a lower sealing bowl 111B and upper sealing bowl 112B, and sealing surfaces 115B and 118B which function substantially similar to 115A and 118A. Secondary seal 110B additionally can comprise two intermediate sealing areas 116B and 117B, which further isolate the connected equipment against HPHT fluids.

Figure 6A:
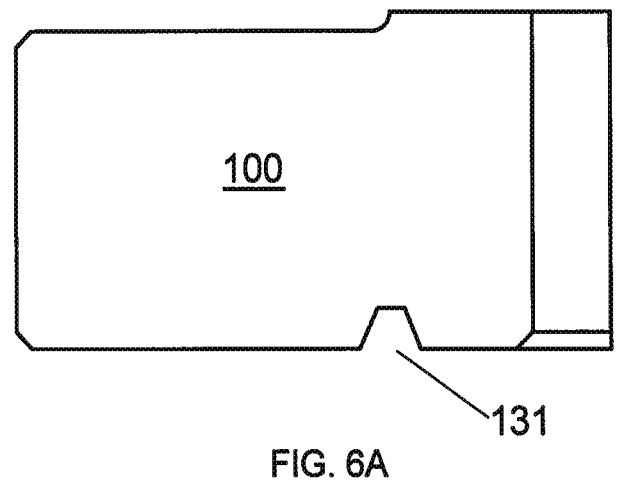
FIG. 6A depicts a prior art flange connection.
Figure 6B:
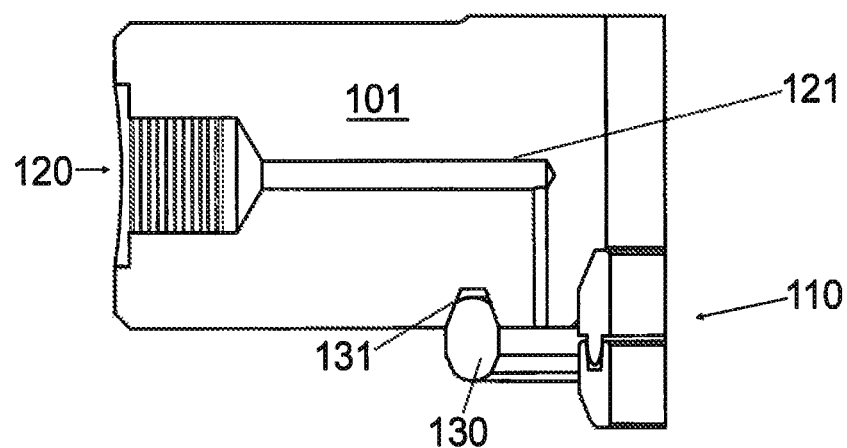
FIG. 6B depicts a zoomed-in flange connection having an embodiment of a test port as disclosed herein.

Referring to FIGS. 6A-6B, a standard prior art flange connection 100 is shown having a groove 131 for accepting a ring-type joint 130 (shown in FIGS. 4A-4C and 6B) acting as a primary seal. FIG. 6B depicts a modified flange 101 having a testing port 120, which is in fluid communication through an angled aperture 121 into the space between ring-type joint 130 and secondary seal 110 (shown as the alternate embodiment depicted in FIG. 5B). The configuration shown in FIG. 6B allows the secondary seal 110 to be monitored and tested independently of ring-type joint 130.

Figure 3C:
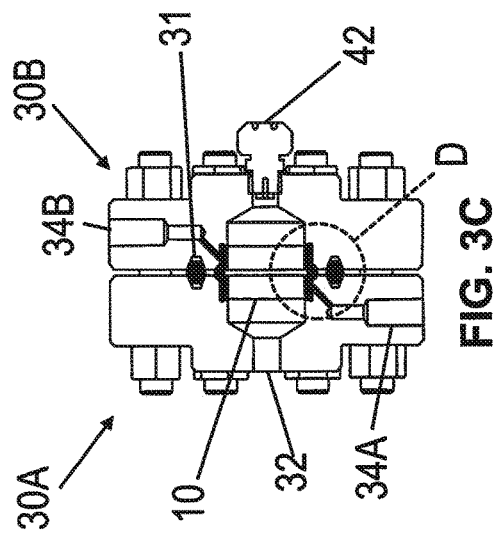
FIG. 3C depicts a cross-section view of an embodiment of the seal disclosed herein for use in a flange-to-flange connection.
Figure 3D:
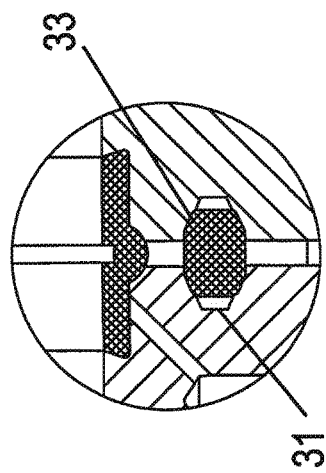
FIG. 3D depicts a magnified view of section D of the embodiment depicted in FIG. 3B.
Figure 3A:
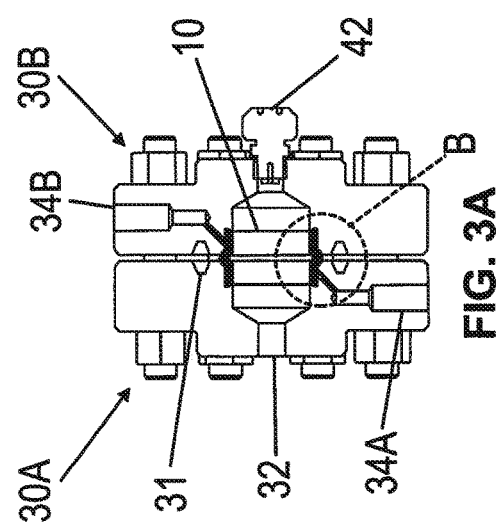
FIG. 3A depicts a cross-section view of an embodiment of the seal disclosed herein for use in a flange-to-flange connection.
Figure 3B:
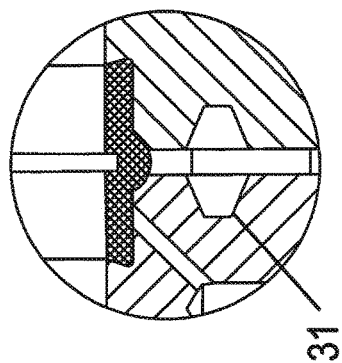
FIG. 3B depicts a magnified view of section B of the embodiment depicted in FIG. 3A.
Figure 7:
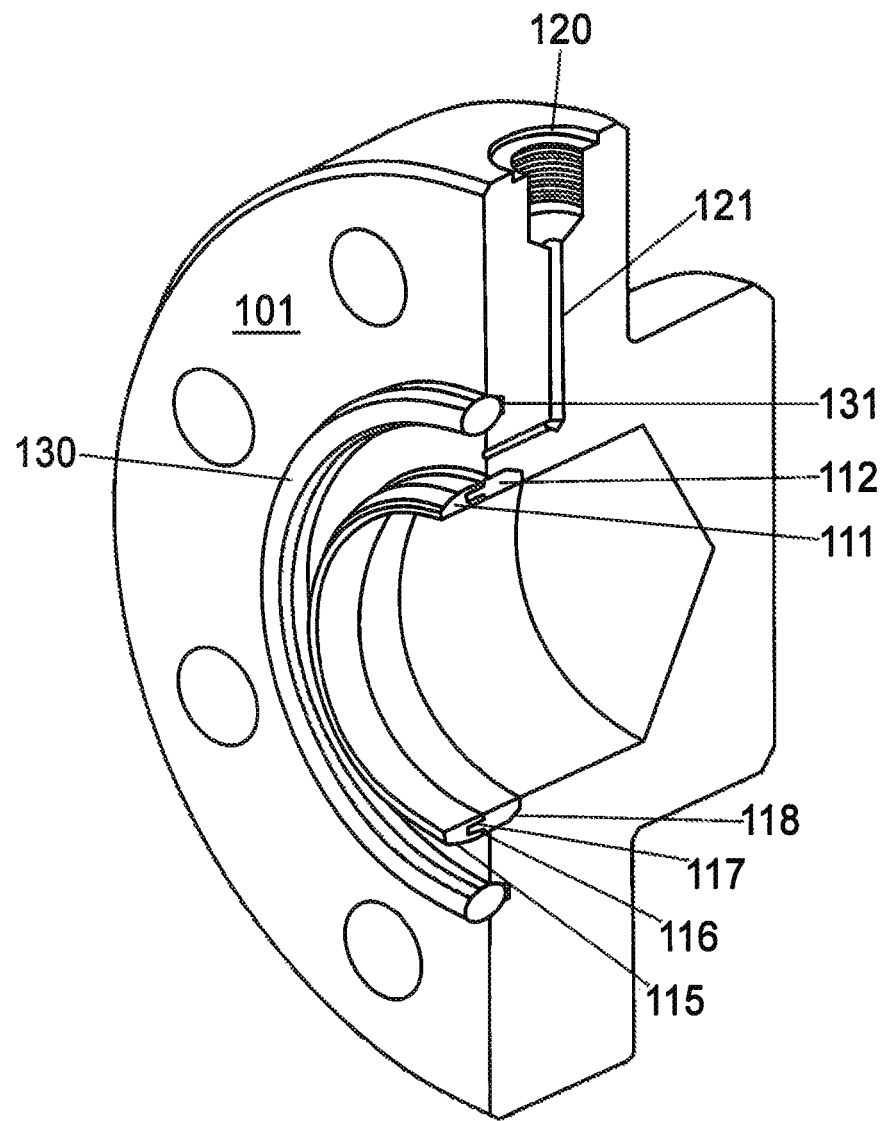
FIG. 7 shows a perspective/cutaway view of a flange having the seal and test port disclosed herein.

Referring to FIG. 7, a sectional view of a blind flange 101 having a configuration substantially similar to that shown in FIG. 3B is depicted, with flange 101 more clearly showing the testing port 120 and aperture 121 in relation to the groove 130 and ring-type joint 131, as well as the metal-to-metal seal 110 (shown as the alternate embodiment depicted in FIG. 2B) comprising lower sealing bowl 111, upper sealing bowl 112, and sealing surfaces 115, 116, 117, and 18.

The depicted embodiments are capable of maintaining seals at pressures of 5,000 psi in flanged outlets and higher in other end connections (OEC), and temperatures in excess of 250° C.; it can be appreciated that all working pressures and configurations described in API specification 6A may be designed for utilizing the central design principles shown herein.

Although several preferred embodiments of the invention have been illustrated in the accompanying drawings and described in the foregoing specification, it will be understood by those of skill in the art that additional embodiments, modifications and alterations may be constructed from the invention principles disclosed herein, while still falling within the scope of the disclosed invention. For instance, while the seal is depicted as a connection between two standard flanges, the same profile may be utilized in other pieces of equipment, e.g., swivel flanges, tubing hangers, clamp hub connections, and OECs.

The invention claimed is:

1. A system for establishing a metal-to-metal seal joining two bores, the system comprising:
    a generally cylindrical seal having a first end, a second end, an inner diameter an outer diameter, a further outer diameter, a first metallic sealing surface defined by a linear surface area between the inner diameter and the outer diameter at the first end, a second metallic sealing surface defined by a linear surface area between the inner diameter and the outer diameter at the second end, a third metallic sealing surface defined by a curved surface area between the outer diameter and the further outer diameter at the first end, and a fourth metallic sealing surface defined by a curved surface area between the outer diameter and the further outer diameter at the second end, wherein the seal further comprises a flexible groove along the inner diameter:
- a first piece of equipment having a bore therethrough, wherein the bore comprises a first inner diameter, a second inner diameter, a third inner diameter, and at least two metallic sealing surfaces between the first and second inner diameters and the second and third inner diameters, respectively: and
- a second piece of equipment having a bore therethrough, wherein the bore comprises the first inner diameter, the second inner diameter, the third inner diameter, and at least two metallic sealing surfaces between the first and second inner diameters and the second and third inner diameters, respectively,
- wherein the at least two metallic sealing surfaces of the first piece of equipment abut the first and third metallic sealing surface of the seal, the at least two metallic sealing surfaces of the second piece of equipment abut the second and fourth metallic sealing surfaces of the seal, and the bores of the first and second pieces of equipment are aligned and joined through the inner diameter of the seal.

2. The system of claim 1, wherein the first metallic sealing surface and the second metallic sealing surface comprise a positive angle.

3. The system of claim 2, wherein one of the at least two metallic sealing surfaces of the first piece of equipment comprises a negative angle and one of the at least two metallic sealing surfaces of the second piece of equipment comprises a negative angle.

4. The system of claim 1, wherein at least one of the first piece of equipment or the second piece of equipment comprises a test port, wherein the test port places an outer diameter of the piece of equipment in fluid communication with the outer diameter of the seal.

5. The system of claim 1, wherein at least one of the first piece of equipment or the second piece of equipment comprises a secondary groove, wherein the secondary groove faces the other of the first piece of equipment or the second piece of equipment, and wherein the secondary groove extends around the bore.

6. The system of claim 5, further comprising a ring gasket seal within the secondary groove.

7. The system of claim 1, wherein at least one of the first piece of equipment or the second piece of equipment is a flange connection.

\* \* \* \* \*